United States Patent

Carlson et al.

Patent Number: 5,108,850
Date of Patent: Apr. 28, 1992

[54] THIN TUBULAR SELF-SUPPORTING ELECTRODE FOR SOLID OXIDE ELECTROLYTE ELECTROCHEMICAL CELLS

[75] Inventors: William G. Carlson, Murrysville; Roswell J. Ruka, Churchill Boro, both of Pa.

[73] Assignee: Westinghouse Electric Corp., Pittsburgh, Pa.

[21] Appl. No.: 561,548

[22] Filed: Aug. 1, 1990

[51] Int. Cl.$^5$ .................... H01M 4/88; H01M 8/12
[52] U.S. Cl. ................................ 429/31; 424/40; 264/61; 428/34.5; 428/34.6
[58] Field of Search ............. 429/31, 40; 264/61; 428/34.5, 34.6

[56] References Cited

U.S. PATENT DOCUMENTS

| | | | |
|---|---|---|---|
| 3,804,674 | 4/1974 | Kudo et al. | 429/40 X |
| 4,174,260 | 11/1979 | Schmidberger | 204/260 |
| 4,197,362 | 4/1980 | Schmidberger et al. | 429/12 |
| 4,276,202 | 6/1981 | Schmidberger et al. | 252/462 |
| 4,414,337 | 11/1983 | Ichikawa et al. | 501/103 |
| 4,562,124 | 12/1985 | Ruka | 429/30 |
| 4,645,622 | 2/1987 | Kock | 252/521 |
| 4,751,152 | 6/1988 | Zymboly | 429/31 |
| 4,888,254 | 12/1989 | Reichner | 429/31 |

*Primary Examiner*—Stephen Kalafut
*Attorney, Agent, or Firm*—Daniel P. Cillo

[57] ABSTRACT

A self-supporting, gas-permeable air electrode tube (16) is made having a sintered structure of calcium-doped LaMnO$_3$, a density of from 60% to 85% of theoretical density, and a Coefficient of Thermal Expansion of from $10.2 \times 10^{-6}$/°C. to $10.8 \times 10^{-6}$/°C., where one end is open and the other end is sealed with a plug (30).

11 Claims, 1 Drawing Sheet

THIN TUBULAR SELF-SUPPORTING ELECTRODE FOR SOLID OXIDE ELECTROLYTE ELECTROCHEMICAL CELLS

GOVERNMENT CONTRACT

The Government of the United States of America has rights in this invention pursuant to Contract No. DE-AC-0280-ET-17089, awarded by the United States Department of Energy.

BACKGROUND OF THE INVENTION

The present invention relates to a self-supporting, doped lanthanum manganite air electrode for electrochemical cells, having an excellent thermal expansion match with the solid oxide electrolyte of the cell and also having an appropriate, low, electrical resistivity, and method of making such an electrode.

High temperature, solid oxide electrolyte, electrochemical cells, such as fuel cells, generally contain a calcia-stabilized zirconia support tube, covered successively by a doped lanthanum manganite air electrode, a stabilized zirconia solid electrolyte and a cermet fuel electrode. U.S. Pat. No. 4,414,337 (Ichikawa et al.) taught support tube compositions and methods of making the support tube on which the air electrode and other component fuel cell layers rested. The composition contained by weight: 0.45% to 5.5% organic, water-soluble binder, 1.5% to 4.0% starch, 1.5% to 3.5% cellulose, 0.5% to 2.0% dispersant, 7% to 11% water, and 75% to 89% high temperature refractory material such as calcia-stabilized zirconia, that is $(ZrO_2)_{102}(CaO)_{1-x}$, aluminum silicate or magnesium silicate. Particle sizes mentioned were as high as 149 micrometers (100 mesh-U.S. Sieve Series), and with 60 wt% to 75 wt% in the 35 micrometer to 53 micrometer range. Here, the starch, cellulose, dispersant and refractory were first mixed, and then added to a solution of the organic binder in water. After de-airing, the composition was formed into a shape and extruded into a tube. One end of the tube was plugged with the same composition which had been previously fired at a temperature higher than the tube, and the other end was fitted with a collar which had been previously fired at a temperature lower than the tube. The whole assembly was then gradually heated from 300° C. to 800° C.

U.S. Pat. No. 4,562,124 (Ruka), relating to air electrodes for high temperature fuel cells, recognized thermal expansion problems between the electrode and electrolyte components. A combination support tube and air electrode having up to 80% density was taught, where cerium was substituted for lanthanum, in the lanthanum manganite air electrode structure. This material had the general chemical formula:

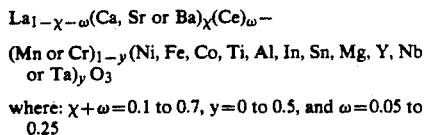

Cerium was taught as essential and as unique in reducing the coefficient of thermal expansion, although its use appeared to increase the resistivity of the electrode. A variety of materials were mixed, pressed, sintered, and tested vs. $La_{0.3}Ca_{0.5}Ce_{0.2}MnO_3$, including $La_{0.35}Ca_{0.65}MnO_3$, with the composition containing cerium having a much better thermal coefficient match to the $(ZrO_2)_{0.9}(Y_2O_3)_{0.1}$ solid electrolyte composition.

Self-supporting air electrode structures were more particularly described in U.S. Pat. Nos. 4,751,152 (Zymboly) and 4,888,254 (Reichner), where the air electrode structures were of a high bulk type, and a centrally ribbed type which required a plurality of air feed tubes, respectively, both described as made of doped or undoped oxides or mixtures of oxides including but not limited to $LaMnO_3$, $CaMnO_3$, $LaNiO_3$, $LaCoO_3$, and $LaCrO_3$, preferably $LaMnO_3$ doped with Sr.

U.S. Pat. No. 4,276,202 (Schmidberger et al.) also taught $LaMnO_3$, $LaNiO_3$ or $LaCoO_3$ electrodes for fuel cells, but required inclusion of chromium. U.S. Pat. No. 4,174,260 (Schmidberger) related to stacked disc, tubular, compound cells with outer electrodes of $La_{0.5}Ca_{0.5}MnO_3$ and inner electrodes of nickel cermet made from nickel particles and stabilized zirconia. The outer electrode was slurry-sprayed over the outer surface of the tubular body and then sintered.

U.S. Pat. No. 4,645,622 (Kock), relating to highly electrically conductive ceramics for fuel cell electrodes, which also have a high resistance against high temperatures and oxidized gases, taught a narrow grouping of $La_{0.44\ to\ 0.48}\ Ca_{0.42\ to\ 0.50}\ MnO_3$ materials.

What is needed is an air electrode that will be uniquely suitable as a self-supporting air electrode of a thin tubular design, requiring only a single air feed tube, for use in a solid oxide fuel cell, where the fuel cell also contains a stabilized zirconia solid electrolyte and a nickel-zirconia cermet fuel electrode, where the air electrode will have a very close thermal match with the electrolyte and fuel electrode without increasing resistivity. One of the objects of this invention is to provide such an electrode, and a method of making it.

SUMMARY OF THE INVENTION

Accordingly, the present invention resides in a method of making a self-supporting air electrode tube characterized by the steps of:

(1) dry-mixing $MnO_2$, $CaCO_3$ and $La_2O_3$ powder in an amount effective to provide a calcium-doped $LaMnO_3$ material after calcining;

(2) pressing the powder into a shape;

(3) calcining the pressed shape at a temperature of from 1,300° C. to 1,700° C.;

(4) crushing the calcined shape to provide calcined particles of calcium-doped $LaMnO_3$ having a particle size range of from 0.1 micrometer to 105 micrometers;

(5) mixing the calcined particles with a decomposable cohesion agent, a decomposable pore-forming agent, and a water-soluble binder, to provide a formable composition, where the calcined particles constitute from 90 weight% to 95 weight% of the composition;

(6) forming the composition into a thin tubular shape; and (7) heating the tube at from 1,300° C. to 1,700° C., to vaporize the binder, cohesion agent and pore-forming agent and provide a consolidated, sintered tube of calcium-doped $LaMnO_3$ having a density of from 60% to 85% of theoretical density and a Coefficient of Thermal Expansion of from $10.2 \times 10^{-6}$/° C. to $10.8 \times 10^{-6}$/° C.;

Preferably, one end of the tube is plugged with additional formable composition after step (6) and before step (7). The resultant plugged tube provides a closed-end, sintered, thin-walled tube, capable of operating in a heated air environment as an electrically conductive electrochemical cell electrode. Preferably, the pressing, calcining and crushing steps are repeated after step (4) to provide improved homogeneity, the cohesion agent is a starch, the pore-forming agent is a cellulose-containing material, and the doped $LaMnO_3$ material is $La_{1-x}Ca_xMnO_3$, where $\chi = 0.1$ to $0.25$.

The invention further resides in a self-supporting gas-permeable, sintered, thin-walled, high temperature electrically conductive electrode tube, said tube characterized as having a sintered structure of calcium-doped $LaMnO_3$, a density of from 60% to 85% of theoretical density, a Coefficient of Thermal Expansion of from $10.2 \times 10^{-6}/°C.$ to $10.8 \times 10^{-6}/°C.$, and the capability of operating in a heated air environment as a fuel cell electrode. Preferably, the structure is $La_{1-x}Ca_xMnO_3$, where $\chi = 0.1$ to $0.25$. In a fuel cell, this air electrode will be in contact with and substantially surrounded on the outside by an yttria-stabilized zirconia solid electrolyte, where the difference in Coefficient of Thermal Expansion between the two will be no more than $0.3 \times 10^{-6}/°C.$ Throughout this specification it will be understood that the Coefficient of Thermal Expansion terms are from a range of 25° C. to 1,000° C. and include length terms that can be cancelled; that is, $m/m/°C.$ or $cm/cm/°C.$ The sintered tube of this invention can be used as a self-supporting air electrode in a solid oxide fuel cell also containing solid oxide electrolyte and a fuel electrode, and it will have a Coefficient of Thermal Expansion close to the electrolyte without increasing resistivity, and will have sufficient structural integrity to operate at high temperatures in an air environment while supporting a variety of layers.

BRIEF DESCRIPTION OF THE DRAWINGS

In order that the invention can be more clearly understood, conventional embodiments thereof will now be described, by way of example, with reference to the accompanying drawings, in which.

DESCRIPTION OF THE PREFERRED EMBODIMENTS

Figure 1:
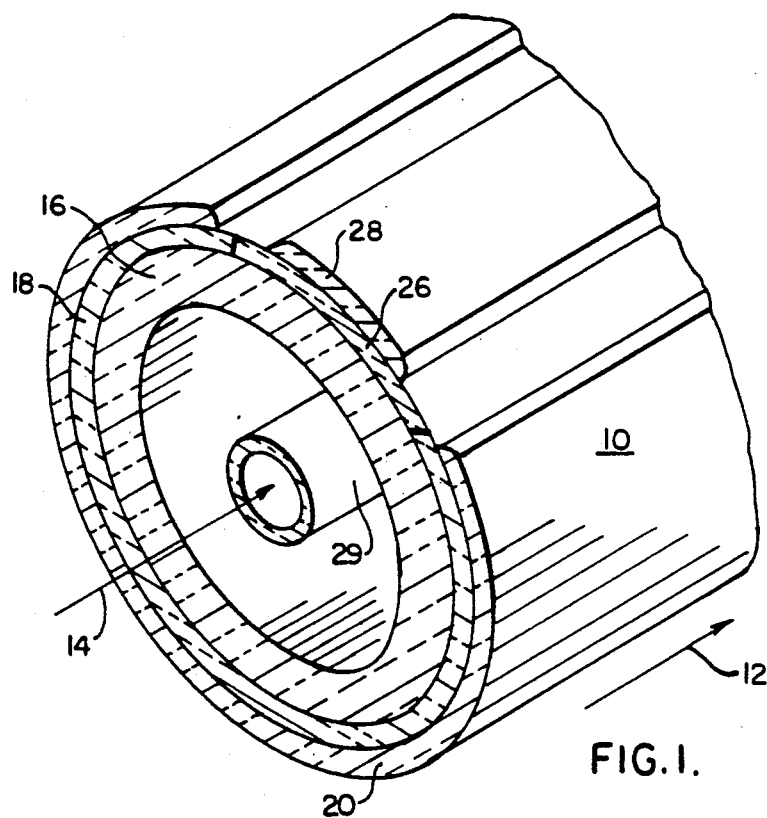
FIG. 1 is a schematic, sectional view of a preferred embodiment of a single, tubular electrochemical cell, showing the self-supporting air electrode layer formed by the method of this invention, supporting other components of the cell.

Referring now to FIG. 1 of the Drawings, a preferred, tubular, electrochemical cell 10 is shown. The preferred configuration is based upon a fuel cell system, wherein a flowing gaseous fuel, such as hydrogen or carbon monoxide, is directed axially over the outside of the cell, as indicated by the arrow 12, and an oxidant, such as air or $O_2$, indicated by the arrow 14, flows through a feed tube to the end of the cell and then back near the inside wall of the cell. Where the cell is as shown, and operated at a high temperature, oxygen molecules pass through the porous, electronically conductive air electrode structure 16, and are changed to oxygen ions at the air electrode-solid electrolyte interface. The oxygen ions then diffuse through the solid electrolyte 18, to combine with fuel at the fuel electrode 20, which is usually of a metal-ceramic or cermet construction.

The air electrode, or cathode 16, that is, the electrode which will be in contact with the oxidant (air or oxygen), will, in self-supporting form, have a porous wall approximately 1 millimeter to 3 millimeters thick, preferably from 1 millimeter to 2 millimeters thick. Surrounding most of the outer periphery of the air electrode 16 is a layer of gas-tight solid electrolyte 18, generally comprised of yttria-stabilized zirconia about 1 micrometer to about 100 micrometers thick (0.001 millimeter to 0.1 millimeter). The electrolyte 18 can be deposited onto the air electrode by well-known, high temperature, electrochemical vapor deposition techniques. A preferred electrolyte composition is $(Y_2O_3)_{0.1}(ZrO_2)_{0.9}$ which has a Coefficient of Thermal Expansion of about $10.5 \times 10^{-6}/°C.$ between 25° C. and 1,000° C. As seen in the figure, the air electrode structure 16 is thin and of low bulk design not requiring a rib structure, so that only one air feed tube or injector 29 need be used. Such an air electrode structure 16 is inexpensive and simplifies manufacturing processes.

The dense interconnection material 26, which preferably extends the active axial length of each elongated cell 10 as shown, must be electrically conductive in both an oxidizing and reducing environment. The gas-tight interconnection 26 is roughly similar in thickness to the electrolyte, about 30 micrometers to about 100 micrometers (0.03 millimeter to 0.1 millimeter). The interconnection should be non-porous (over about 95% dense) and preferably be nearly 99% to 100% electronically conductive at 1,000° C., the usual operating temperature of a fuel cell. The usual interconnection material is doped lanthanum chromite. Usually, an electrically conductive top layer 28 is deposited over the interconnection 26.

The final layer is the fuel electrode, or anode 20, which is generally composed of nickel or cobalt-zirconia cermet, and is about 100 micrometers thick. A major portion of the fuel electrode is a skeletal extension of the yttria-stabilized zirconia solid electrolyte material. The self-supporting configuration and the materials used for the electrolyte, interconnection, and fuel electrodes are well known, and described in U.S. Pat. No. 4,751,152, herein incorporated by reference. Both electrodes are high temperature electrically conductive; that is, conductive at the usual 1,000° C. cell-operating temperature.

As can be seen from FIG. 1, the solid electrolyte 18 is in complete overlapping contact with the self-supported air electrode 16. It is essential to fuel cell operation at 1,000° C. and during thermal cycling, that their Coefficients of Thermal Expansion be almost the same, that the air electrode be a good conductor of electricity at the 1,000° C. operating temperatures, and that the air electrode be of sufficient structural integrity to support the electrolyte and other layers shown in FIG. 1. Elimination of the prior zirconia support tube removes an entire layer that also would have been in complete contact with the air electrode and that would have contributed to thermal mismatch problems. The only other substantially complete overlapping is the fuel electrode 20 with the solid electrolyte 18; however, as previously pointed out, the fuel electrode, in part, is a skeletal extension of the electrolyte and so thermal mismatch is less of a problem there.

The self-supporting, gas-permeable, air electrode tube 16 of this invention is a sintered, particulate structure of calcium-doped lanthanum manganite, preferably having the chemical formula: $La_{1-x}Ca_xMnO_3$, where $\chi = 0.1$ to 0.25. The tube has a density of from 60% to 85% of theoretical density; that is, it is from 15% to 40% porous by volume. Its actual density is from approximately 4 g/cm³ to 5 g/cm³. The tube has a Coefficient of Thermal Expansion of from $10.4 \times 10^{-6}/°$ C. to $10.8 \times 10^{-6}/°$ C., preferably from $10.4 \times 10^{-6}/°$ C. to $10.6 \times 10^{-6}/°$ C., all in the range of from 25° C. to 1,000° C. The tube will have, preferably, an electrical resistivity at 1,000° C. of from approximately 0.006 Ω-cm to 0.015 Ω-cm.

The air electrode tube will consist of sintered particles which provide a matrix for air passages or interconnected voids through the structure. Only within the described limits will the air electrode be not only thermally matching to the electrolyte, but also capable of supporting it and the fuel electrode without excessive wall thickness or a rib structure. The self-supporting electrode wall thickness can range from 1 millimeter to 3 millimeters, but is preferably from 1 millimeter to 2 millimeters. The inside diameter of the electrode tube can vary widely, but in one preferred embodiment, it is approximately 10 millimeters.

Figure 2:
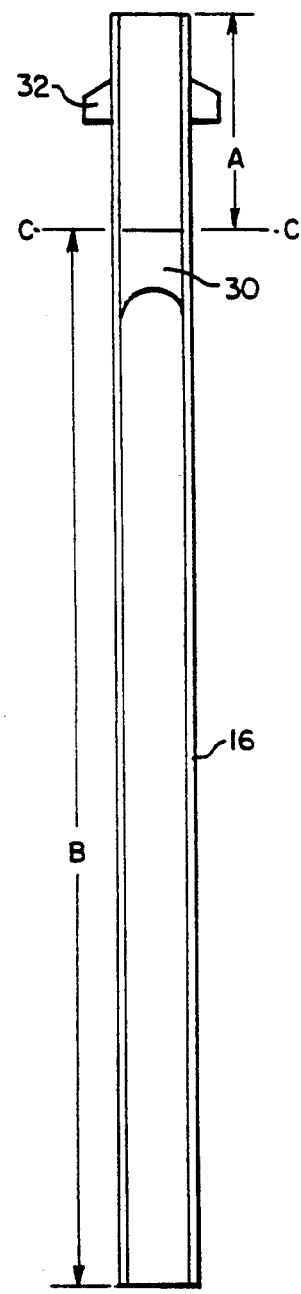
FIG. 2, which best shows the invention, is a cross-section of the plugged air electrode tube of this invention prior to cutting off its collared end.

The self-supporting air electrode tube, shown in cross-section in FIG. 2, is made by mixing a formable composition containing particles of calcium-doped LaMnO₃, extruding or isostatic pressing the composition into a tube of circular cross-section, plugging one end of the tube with additional formable composition, and then heating to sinter the tube.

As a first step in making the self-supporting air electrode tube, oxides of Mn and La and carbonates of Ca, such as $MnO_2$, $CaCO_3$ and $La_2O_3$, or comparable materials, are weighed out in the proper proportions to give the desired calcium-doped lanthanum manganite composition after calcining, and then blended together. The powder is then pressed into a shape, preferably a cylindrical pellet. The shape is then calcined. The calcined shape is then crushed to provide particles below 300 micrometers diameter. Preferably, the shape is first crushed, screened to provide particles below 840 micrometers diameter, further ground, screened to provide particles below 150 micrometers diameter, pressed again into a shape, calcined a second time to give improved homogeneity, crushed to provide particles below 840 micrometers, and then further ground to provide a particle size distribution between 0.5 micrometer and 105 micrometers (140 mesh-U.S. Sieve Series).

The preferred particle size distribution after final crushing contains 95% of the particles smaller than 53 micrometers (270 mesh-U.S. Series), 75% of the particles smaller than 37 micrometers (400 Mesh-U.S. Sieve Series), 50% of the particles smaller than 10 micrometers, and 25% of the particles smaller than 6 micrometers. This particle size distribution, emphasizing small particles, is very important in providing strong yet thin porous tubes for the doped LaMnO₂ composition.

The powder is then mixed with from 1 weight% to 5 weight% of a decomposable cohesion agent, preferably an organic starch, for example cornstarch, rice starch, potato starch, and the like; 1 weight% to 4 weight% of a decomposable pore-forming agent, preferably an organic cellulose-containing material; for example, maple wood flour or other fiber cellulose; 1 weight% to 4 weight% of an organic, water-soluble, binder; for example, polyvinyl alcohol, polyvinyl acetate, wax emulsions of paraffin, and the like, which provides dry strength for handling; and up to 1 weight% of an optional wetting agent to help in extrusion, such as condensed napthalene sulfonic acid. The rest of the mixture will constitute the calcined powder, preferably 90 weight% to 95 weight%.

Preferably, the particle size of the cohesion agent and the pore-forming agent should be below 75 micrometers diameter, should decompose between 100° C. and 550° C., and their selection should allow decomposition at least 50° C. apart. The binder should also decompose between 100° C. and 550° C. Preferably all the ingredients are mixed dry and the wet-mixed with water-soluble binder in water solution to provide a wet mix which is aged for approximately 6 hours to 12 hours, to promote water distribution and homogeneity. This formable mixture is then extruded or isostatic-pressed, into a tubular shape.

Referring now to FIG. 2 of the Drawings, preferably, a solid cylindrical plug 30 of the formable mixture is pushed into the tube 16, a selected distance A, usually 2.5 cm to 7 cm from one end of the tube. The plugged or closed tube is dried, and then heated at from 1,300° C. to 1,700° C. to sinter the tube walls and plug together, to vaporize the binder, cohesion agent and pore-forming agent, and to provide a consolidated, sintered tube of, preferably, $La_{1-\chi}Ca_\chi MnO_3$, where $\chi = 0.1$ to 0.25, having a density between 60% and 85% of theoretical density depending on the amount of pore-forming agent in the original mixture. The tube is then cut along plane C-C and the closed end is smoothed or rounded (not shown).

In an electrochemical cell, such as a fuel cell, this air electrode tube will be in contact with and substantially surrounded on its exterior by an yttria-stabilized zirconia electrolyte, usually $(Y_2O_3)_\chi(ZrO_2)_{1-\chi}$, where X is 0.1, except for an axially elongated radial segment for the interconnection, as is well known in the art. The difference in Coefficient of Thermal Expansion between the electrolyte and air electrode will be no more than $0.3 \times 10^{-6}/°$ C., preferably no more than $0.2 \times 10^{-6}/°$ C., using the powder mixture described herein. The electrolyte in turn will be substantially covered by a fuel electrode cermet material.

The invention will now be illustrated with reference to the following Example which is not to be considered in any way limiting.

EXAMPLE

A number of high strength, self-supporting, gas-permeable, thin-walled air electrode tubes were made, and compared in terms of thermal expansion and electrical resistivity to other air electrode, electrolyte, and support tube samples. The following ingredients were mixed:

| Grams | Material | Grade |
| --- | --- | --- |
| 11,740 | MnO₂ | Certified Grade C-64 (Fisher)* |
| 2,700 | CaCo₃ | Certified Grade M-108 (Fisher) |
| 17,600 | La₂O₃ | (Molycorp) |

*Sieved so that all particles were less than 149 micrometers.

The ingredients were then blended together in a V-cone blender for 2 hours. This mixture was calculated to provide $La_{0.8}Ca_{0.2}MnO_3$ upon sintering. The blended powder was then pressed into right circular cylinders of 7.62 cm diameter $\chi$ 1.9 cm height at a pressure of 176.25 kg/cm² (2,500 psi).

The pressed cylinders were calcined at 1,500° C. for a period of 3 hours. The calcined cylinders were then crushed to pass an 840-micrometer sieve, and this powder was then pulverized in a shatterbox for a period of 3 minutes and screened through a 149 micrometer sieve. The resultant powder was again pressed into right circular cylinders and calcined a second time at 1,500° C. for a period of 5 hours. The calcined cylinders were then crushed to pass an 840 micrometer sieve and then pulverized in a shatterbox to give the following particle size distribution:

100% less than 37 micrometers;
75% less than 11 micrometers;
50% less than 5.5 micrometers;
25% less than 3 micrometers;
10% less than 1.75 micrometers; and
0% less than 0.5 micrometer.

X-ray analysis of the calcined powder showed a single phase material of a perovskite like structure.

After powder preparation, sample tubes for evaluation were prepared. The calcined-crushed-shatterboxed powder was combined with other ingredients to prepare an extrusion batch of the composition:

|  | Weight % |
|---|---|
| $La_{.8}Ca_{.2}MnO_3$ Powder | 92.07 |
| Corn Starch | 3.04 |
| Cellulose | 2.15 |
| *Optional Wetting Agent | 0.54 |
| Polyvinyl Alcohol Binder | 2.20 |
|  | 100.00 |

*Condensed napthalene sulfonicacid

The starch provides cohesion and plasticity necessary for extrusion, the cellulose forms pores upon sintering and the polyvinyl alcohol binder (PVC) the dry strength for handling, and all decompose below about 500° C.

The dry ingredients were dry-mixed for 1 hour in a V-cone bender and then wet-mixed with polyvinyl alcohol in a water solution (15.5 weight% PVA) for 1 hour in a DAY-type sigma blade mixer. The wet mix was sealed tightly in a plastic bag, stored overnight to age, and then extruded into tubular forms about 55.8 cm (22 inches) long using a laboratory extrusion apparatus with an extrusion die of 1.42 cm (0.560 inch) internal diameter and core pin of 1.02 cm (0.403 inch) diameter. Tubes when dried had an outside diameter of 14 mm and an inside diameter of 10 mm (a 2 mm thick wall). Tubes were then dried in a horizontal position, then sintered for various temperatures as shown below, and permeability, strength and electrical resistance measured, as shown in Table I below:

TABLE I

| Samples | Sintering Parameters Temp. °C. | Time hr | Apparent Density g/cm³ | % Density & % Porosity *% TD | % Porosity | Burst Strength kg/cm² |
|---|---|---|---|---|---|---|
| 1–4 | 1,450 | 1 | 4.05 | 63.8 | 36.2 | 70 (935 psi) |
| 5–8 | 1,550 | 1 | 4.37 | 68.9 | 31.1 | 232 (3,290 psi) |
| 9–12 | 1,600 | 1 | 4.59 | 72.4 | 27.6 | 276 (3,925 psi) |

*Theoretical Density

Sintering at over 1,500° C. gives the most preferred balance of adequate porosity and extremely good strength (burst strength).

Tubes with one end closed and of 30.48 cm (12 inches) length were used for evaluation as self-supporting air electrode tubes. Tubes were plugged approximately 5.7 cm (2¼ inches) from one end, distance A in FIG. 2, using a solid cylindrical plug of the plastic extrusion composition by compacting the plug within the tube using two opposing rams and applying sufficient pressure to consolidate the plastic mass. Also, for sintering in a vertical position, a collar, 32 in FIG. 2, about the tube was applied to provide a ledge for hanging the tube vertically while sintering. This was accomplished by slipping a plastic ring of the extrusion composition over the outer diameter of the tube and then consolidating it about the tube using two opposing tubular rams in conjunction with a confining housing.

The sample 5–8 tubes with suitable plugs and collars were prepared and sintered at 1,550° C. for 1 hour. After sintering, the collared end was cut from the tube, providing the tube length B in FIG. 2, and the closed end rounded using a diamond-faced hemispherical tool. The physical and electrical properties of these tubes were similar to Samples 5–8 presented in Table I for the sintering conditions of 1,550° C. and 1 hour. Thermal expansion and electrical resistivity tests were run on the Samples 5–8 closed tube vs. $(Y_2O_3)_{0.1}(ZrO_2)_{0.9}$ solid electrolyte material, typical $La_{0.9}Sr_{0.1}MnO_3$ electrode material, and prior art $(CaO)_{0.15}(ZrO_2)_{0.85}$ support tube material and the results are shown in Table II below:

TABLE II

| Material | Function | Coefficient of Thermal Expansion × 10⁻⁶ m/m/°C. (25° C. to 1,000° C.) | Electrical Resistivity at 1,000° C. Ω-cm |
|---|---|---|---|
| $(CaO)_{.15}(ZrO_2)_{.85}$ | Porous Support Tube | 10.4 | — |
| $La_{.9}Sr_{.1}MnO_3$ | Electrode Material | 11.0 | .012–.016 |
| $(Y_2O_3)_{.1}(ZrO_2)_{.9}$ | Solid Electrolyte | 10.5 | — |
| $La_{.8}Ca_{.2}MnO_3$ | Air Electrode | 10.6 | .009–.014 |

As can be seen, the $La_{0.8}Ca_{0.2}MnO_3$ air electrode of this invention gives a very close match in thermal expansion with the solid electrolyte material which it would ultimately contact in a fuel cell.

We claim:

1. A method of making a self-supporting air electrode tube comprising:
   (1) dry-mixing $MnO_2$, $CaCO_3$ and $La_2O_3$ powder in an amount effective to provide a calcium-doped $LaMnO_2$ material after calcining;

(2) pressing the powder into a shape;

(3) calcining the pressed shape at a temperature of from 1,300° C. to 1,700° C.;

(4) crushing the calcined shape to provide calcined particles of calcium-doped $LaMnO_3$ having a particle size range of from 0.1 micrometer to 105 micrometers;

(5) mixing the calcined particles with a decomposable cohesion agent, a decomposable pore-forming agent, and a water-soluble binder, to provide a formable composition, where the calcined particles constitute from 90 weight% to 95 weight% of the composition;

(6) forming the composition into a thin tubular shape; and (7) heating the tube at from 1,300° C. to 1,700° C. to vaporize the binder, cohesion agent, and pore-forming agent and provide a consolidated, sintered tube of calcium-doped $LaMnO_3$ having a density of from 60% to 85% of theoretical density and a Coefficient of Thermal Expansion of from $10.2 \times 10^{-6}$/° C. to $10.8 \times 10^{-6}$/° C., capable of operating in a heated air environment as an electrically conductive electrochemical cell electrode.

2. The method of claim 1 where, in step (4), the calcined particles have a particle size range wherein 95% of the particles are smaller than 53 micrometers, 75% of the particles are smaller than 37 micrometers, 50% of the particles are smaller than 10 micrometers, and 25% of the particles are smaller than 6 micrometers, and where, between step (6) and step (7), one end of the tube is plugged with additional formable composition.

3. The method of claim 1, where pressing, calcining and crushing steps are repeated after step (4).

4. The method of claim 1, where, in step (5), the cohesion agent is a starch, the pore-forming agent is a cellulose-containing material, and the sintered tube walls are from 1 millimeter to 3 millimeters thick.

5. The method of claim 1, where the doped $LaMnO_3$ material is $La_{1-\chi}Ca_\chi MnO_3$, where $\chi = 0.1$ to 0.25.

6. An air electrode made by the method of claim 1.

7. A self-supporting, gas-permeable, sintered, high temperature electrically conductive electrode tube, having a sintered structure of calcium-doped $LaMnO_3$, a density of from 60% to 85% of theoretical density, a Coefficient of Thermal Expansion of from $10.2 \times 10^{-6}$/° C. to $10.8 \times 10^{-6}$/° C., and the capability of operating in a heated air environment as a fuel cell electrode.

8. A structure including the electrode tube of claim 7, in contact with and substantially surrounded on the outside by an yttria-stabilized zirconia solid electrolyte, where the difference in Coefficient of Thermal Expansion between the electrode and electrolyte is no more than $0.3 \times 10^{-6}$/° C.

9. The electrode tube of claim 7, where the particulate structure is $La_{1-\chi}Ca_\chi MnO_3$, where $\chi = 0.1$ to 0.25.

10. The electrode tube of claim 7, where the electrical resistivity of the tube material at 1,000° C. is from 0.0060 Ω-cm to 0.015 Ω-cm.

11. A fuel cell including the electrode tube of claim 7, in contact with and substantially surrounded on the outside by a yttria-stabilized zirconia solid electrolyte, where said solid electrolyte is in contact with and substantially surrounded on its outside by a nickel or cobalt-zirconia cermet fuel electrode.

* * * * *